US009042104B2

(12) United States Patent
Tsai et al.

(10) Patent No.: US 9,042,104 B2
(45) Date of Patent: May 26, 2015

(54) PORTABLE ELECTRONIC DEVICE AND ELECTRONIC MODULE FIXING STRUCTURE THEREOF (75) Inventors: Yu-Han Tsai, New Taipei (TW); Chun-Wang Lin, New Taipei (TW); Ching-Wei Ku, New Taipei (TW); Chia-Hsing Yu, New Taipei (TW); Yao-Te Tsai, New Taipei (TW); Chia-Hung Tsai, New Taipei (TW)

(73) Assignee: Wistron Corporation, New Taipei, Taiwan (TW)

( * ) Notice: Subject to any disclaimer, the term of this patent is extended or adjusted under 35 U.S.C. 154(b) by 345 days.

(21) Appl. No.: 13/596,083

(22) Filed: Aug. 28, 2012

(65) Prior Publication Data
US 2014/0022740 A1  Jan. 23, 2014

(30) Foreign Application Priority Data

Jul. 18, 2012 (TW) .............................. 101125883 A (51) Int. Cl.
*H05K 7/00* (2006.01)
*G06F 1/18* (2006.01)
*G11B 33/12* (2006.01)

(52) U.S. Cl.
CPC .............. *G06F 1/187* (2013.01); *G11B 33/124* (2013.01)

(58) Field of Classification Search
CPC ............................. G06F 1/187; G11B 33/124

USPC ............ 361/679.37–679.39, 679.29–679.31, 361/679.41, 679.43, 679.58, 640, 727, 747, 361/754, 798, 801, 679.02; 439/155, 159; 174/542

See application file for complete search history.

(56) References Cited

U.S. PATENT DOCUMENTS

| 6,711,010 | B2 * | 3/2004 | Wei et al. .................. 361/679.31 |
| 6,817,874 | B2 * | 11/2004 | Okabe ............................ 439/157 |
| 7,077,671 | B2 * | 7/2006 | Su et al. ......................... 439/159 |
| 2005/0039201 | A1 | 2/2005 | Hsu |
| 2011/0032670 | A1 * | 2/2011 | Tsai et al. ................ 361/679.31 |

* cited by examiner

*Primary Examiner* — Jayprakash N Gandhi
*Assistant Examiner* — Mukund G Patel
(74) *Attorney, Agent, or Firm* — Jianq Chyun IP Office (57) ABSTRACT A portable electronic device includes an electronic module and an electronic module fixing structure. The electronic module fixing structure includes a main body, a sliding component, a rod and an elastic component connected between the main body and the sliding component. The main body has a track with a positioning portion. The sliding component is slidably disposed on the main body. The rod is rotatably connected with the sliding component. An end of the rod is adapted to move along the track. When the end is located at the positioning portion, the end and the positioning portion are interfered with each other to position the sliding component. When the electronic module pushes the sliding component, the rod is rotated to drive the end to move away from the positioning portion, and the sliding component pushes the electronic module away from the main body through elastic force of the elastic component.

32 Claims, 10 Drawing Sheets

PORTABLE ELECTRONIC DEVICE AND ELECTRONIC MODULE FIXING STRUCTURE THEREOF

CROSS-REFERENCE TO RELATED APPLICATION

This application claims the priority benefit of Taiwan application serial no. 101125883, filed on Jul. 18, 2012. The entirety of the above-mentioned patent application is hereby incorporated by reference herein and made a part of this specification.

BACKGROUND

1. Field of the Invention

The present is directed to an electronic device and an electronic module fixing structure thereof and more particularly, to a portable electronic device and an electronic module fixing structure thereof.

2. Description of Related Art

Advancement of semiconductor devices and display technology leads to continuous development of electronic devices towards compactness, capabilities for performing multiple functions, and portability. Common portable electronic device include tablet PCs, smart phones, notebook computers (NBs), and so forth. Taking the NB for example, since the NB has the same functions as a desktop computer and is convenient for being carried portably. Therefore, the NB has become an indispensable portable tool for some users. With the steady drop on its price, some users even directly replace the desktop computer with the NB.

In some NBs of the technique in the related art, when desiring to disassemble and replace a hard-disk module, the user has to remove a cover body on the bottom of the casing before taking out the hard-disk module inside the casing, which cause inconvenience to maintenance and replacement of the hard-disk module. Accordingly, how to fix the hard-disk module and also allow convenience for disassembling the hard-disk module through a simple structure is one of the most important issues for the design of current NBs.

SUMMARY

The present invention is directed to a portable electronic device having an electronic module fixing structure for disassembling an electronic module more simple and easily.

The present invention is directed to an electronic module fixing structure for disassembling an electronic module more simple and easily.

The present invention is directed to a portable electronic device, including an electronic module and an electronic module fixing structure. The electronic module fixing structure includes a main body, a sliding component, a rod and an elastic component. The main body has a track. The track has a positioning portion. The sliding component is slidably disposed on the main body. When the electronic module is installed in the main body, the sliding component is located at a first position. The rod is rotatably connected with the sliding component. An end of the rod is adapted to move along the track. When the end is located at the positioning portion, the end and the positioning portion are interfered with each other such that the sliding component is positioned at the first position. The elastic component is connected between the main body and the sliding component. When the electronic module receives a force to push the sliding component, the rod is rotated relative to the sliding component to drive the end to move away from the positioning portion, and the sliding component slides to a second position by the elastic force of the elastic component to push the electronic module away from the main body.

The present invention is directed to an electronic module fixing structure applicable to a portable electronic device. The portable electronic device includes an electronic module. The electronic module fixing structure includes a main body, a sliding component, a rod and an elastic component. The main body has a track. The track has a positioning portion. The sliding component is slidably disposed on the main body. When the electronic module is installed in the main body, the sliding component is located at a first position. The rod is rotatably connected with the sliding component. An end of the rod is adapted to move along the track. When the end of the rod is located at the positioning portion, the end and the positioning portion are interfered with each other such that the sliding component is positioned at the first position. The elastic component is connected between the main body and the sliding component. When the electronic module receives a force to push the sliding component, the rod is rotated relative to the sliding component to drive the end to move away from the positioning portion, and the sliding component slides to a second position by the elastic force of the elastic component to push the electronic module away from the main body.

In an embodiment of the present invention, when the sliding component resists the elastic force of the elastic component to slide from the second position to first position, the rod is rotated relative to the sliding component to drive the end of the rod to move to the positioning portion along the track.

In an embodiment of the present invention, when the sliding component is located at the first position, the end of the rod tightly leans against the positioning portion by the elastic force of the elastic component.

In an embodiment of the present invention, the electronic module is adapted to receive the force to push the sliding component along a first direction, and the sliding component is adapted to slide from the first position to the second position along a second direction. The first direction is opposite to the second direction.

In an embodiment of the present invention, the main body includes at least one guiding rail. An extending direction of the guiding rail is parallel to the first direction and the second direction. The electronic module is adapted to slide into the main body along the guiding rail.

In an embodiment of the present invention, the track includes a first segment and a second segment. The first segment is connected with a side of the positioning portion, and the end of the rod is adapted to be guided by the first segment to move to the positioning portion along the first direction. The second segment is connected with the other side of the positioning portion, and the end of the rod is adapted to be guided by the second segment to move away from the positioning portion along the second direction.

In an embodiment of the present invention, the track further includes a third segment. The third segment is connected between the first segment and the second segment, and the end of the rod is adapted to be guided by the third segment to move from the second segment to the first segment.

In an embodiment of the present invention, the track has a first inclined surface and a second inclined surface. The first inclined surface and second inclined surface are intersected with each other to form the positioning portion. When the sliding component is located at the first position, the end of the rod is positioned between the first inclined surface and the second inclined surface.

In an embodiment of the present invention, the sliding component has an axis aperture, and the rod has a bending portion. The bending portion is pivoted to the axis aperture.

In an embodiment of the present invention, the electronic module fixing structure further comprises a fixing plate. The fixing plate is disposed between the sliding component and the main body and pushes against the rod to limit the end of the rod in the track.

In an embodiment of the present invention, the fixing plate has an opening, and the rod penetrates the opening.

In an embodiment of the present invention, the fixing plate includes a first plate body and a second plate body. The first plate body leans against the sliding component. The second plate body is connected with and inclined to the first plate body and pushes against the rod.

In an embodiment of the present invention, the electronic module fixing structure further includes a cover body and a position-limiting component. The cover body is pivoted to the main body. The cover body is adapted to be pivotally rotated to a closed state to cover the electronic module or pivotally rotated to an expanded state to expose the electronic module. The position-limiting component is pivoted to the main body and limits the electronic module in the main body. When the cover body is in the expanded state, the position-limiting component is pushed by the cover body to release the electronic module.

In an embodiment of the present invention, when the sliding component pushes the electronic module away from the main body, the electronic module moves away from the main body along a moving path. When the cover body is in the closed state, the cover body is located on the moving path. When the cover body is in the expanded state, the cover body is not located on the moving path.

In an embodiment of the present invention, the electronic module has a notch, and the position-limiting component has a protrusion. The protrusion is adapted to enter the notch to limit the electronic module. When the position-limiting component is pushed by the cover body, the protrusion moves away from the notch to release the electronic module.

In an embodiment of the present invention, the main body includes an electrical connection portion. When the electronic module is installed in the main body, the electronic module is plugged to the electrical connection portion.

In an embodiment of the present invention, the electronic module is a hard-disk module.

To sum up, when the electronic module of the present invention is installed in the main body of the electronic module fixing structure, the sliding component is fixed by the rod and the positioning portion interfered with each other, such that the electronic module is not possibly pushed by the sliding component to move away from the main body. When a user desires to disassemble the electronic module, the user may press the electronic module to drive the electronic module to push the sliding component, such that the rod is rotated as the sliding component moves to drive the end of the rod to move away from the positioning portion along the track. When the end of the rod moves away from the positioning portion, the sliding component is no longer fixed by the rod and the positioning portion interfered with each other, and thus, the sliding component pushes the electronic module away from the main body by the elastic force of the elastic component. Accordingly, the sliding component pushes the electronic module away from the main body of the electronic module fixing structure merely by the user pressing the electronic module such that the disassembly of the electronic module becomes more simple and easy.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DESCRIPTION OF EMBODIMENTS

Figure 1:
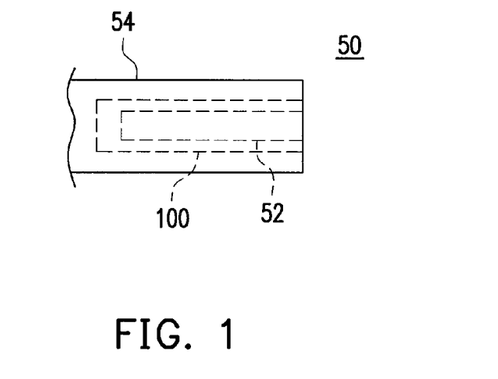
FIG. 1 is a schematic view illustrating a portable electronic device according to an embodiment of the present invention.

FIG. 1 is a schematic view illustrating a portable electronic device according to an embodiment of the present invention. Referring to FIG. 1, a portable electronic device 50 of the present embodiment is, for example, a notebook computer (NB) host and includes an electronic module 52 and an electronic module fixing structure 100. The electronic module fixing structure 100 is disposed in a casing 54 of the portable electronic device 50 and configured to fix the electronic module 52 in the casing 54. For example, the portable electronic device 50 of the present embodiment is a NB host, and the electronic module 52 is a hard-disk module.

Figure 2:
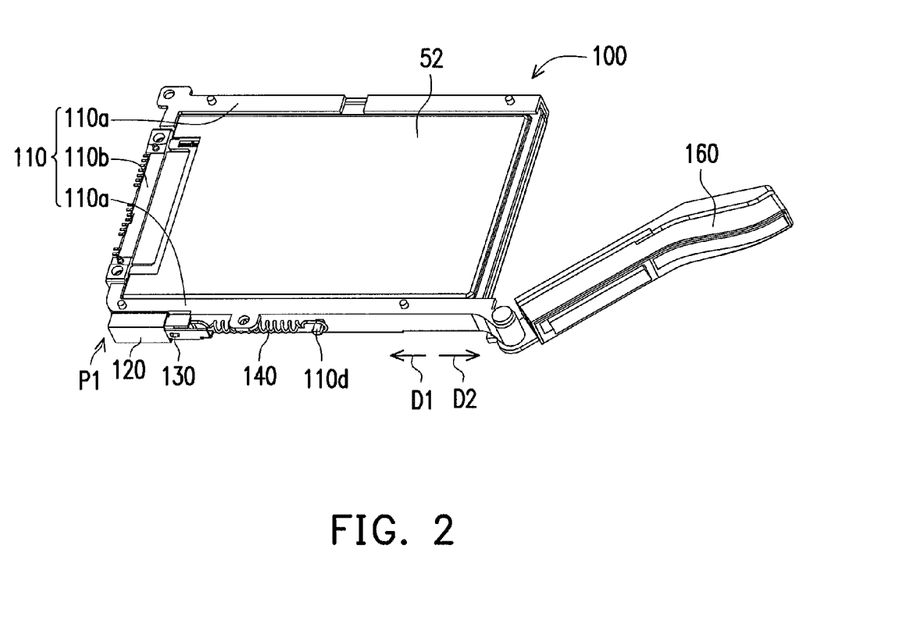
FIG. 2 is a three-dimensional (3D) view illustrating the electronic module and the electronic module fixing structure depicted in FIG. 1.
Figure 3:
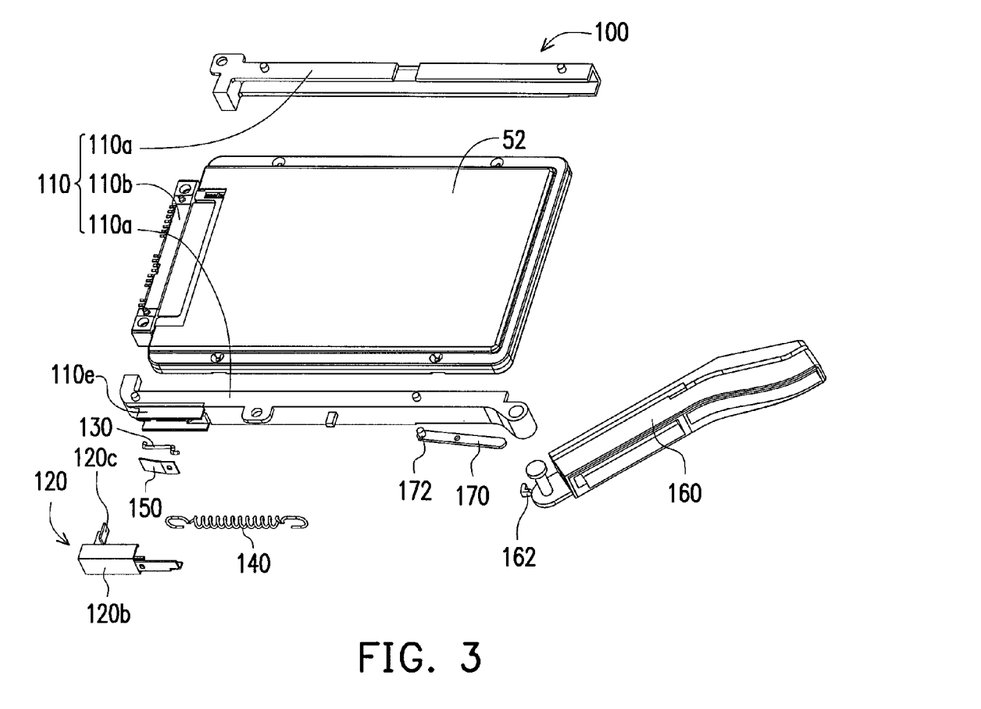
FIG. 3 is an explosive view illustrating the electronic module and the electronic module fixing structure depicted in FIG. 2.

FIG. 2 is a three-dimensional (3D) view illustrating the electronic module and the electronic module fixing structure depicted in FIG. 1. FIG. 3 is an explosive view illustrating the electronic module and the electronic module fixing structure depicted in FIG. 2. Referring to FIG. 2 and FIG. 3, the electronic module fixing structure 100 of the present embodiment includes a main body 110, a sliding component 120, a rod 130 and an elastic component 140. The main body 110 includes two guiding rails 110a and an electrical connection portion 110b. The electronic module 52 is adapted to slide into the main body 110 along the guiding rails 110a to be plugged to the electrical connection portion 110b. The sliding component 120 is slidably disposed on the main body 110. The rod 130 is rotatably connected with the sliding component 120. The elastic component 140 is, for example, connected between the main body 110 and the sliding component 120.

Figure 4:
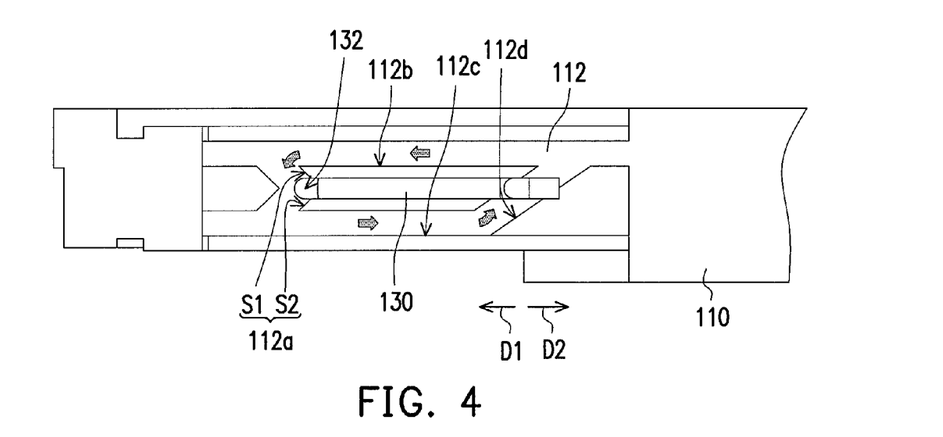
FIG. 4 is a partial side view of the electronic module depicted in FIG. 2.

FIG. 4 is a partial side view of the electronic module depicted in FIG. 2. For a more clear view, FIG. 4 merely illustrates the main body 110 and the rod 130 depicted in FIG. 2. Referring to FIG. 4, the main body 110 has a track 112, and the track 112 has a positioning portion 112a. An end 132 of the rod 130 is adapted to move along the track 112 according to the paths indicated by the arrows in the figures. When the electronic module 52 is installed in the main body 110 as shown in FIG. 2, the sliding component 120 is located at a first position P1. When the end 132 of the rod 130 is located at the positioning portion 112a of the track 112 as shown in FIG. 4, the end 132 and the positioning portion 112a are interfered with each other to position the sliding component 120 at the first position P1.

Figure 5A:
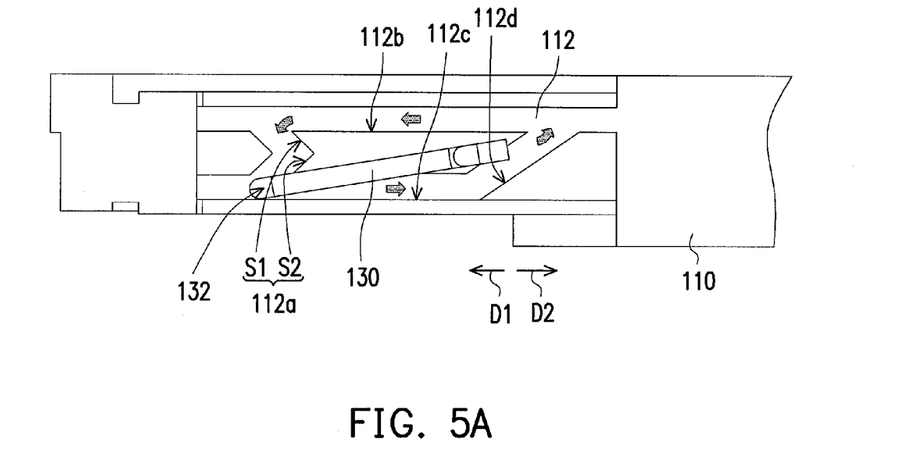
FIG. 5A through FIG. 5C are operation flowcharts illustrating the rod depicted in FIG. 4.
Figure 5B:
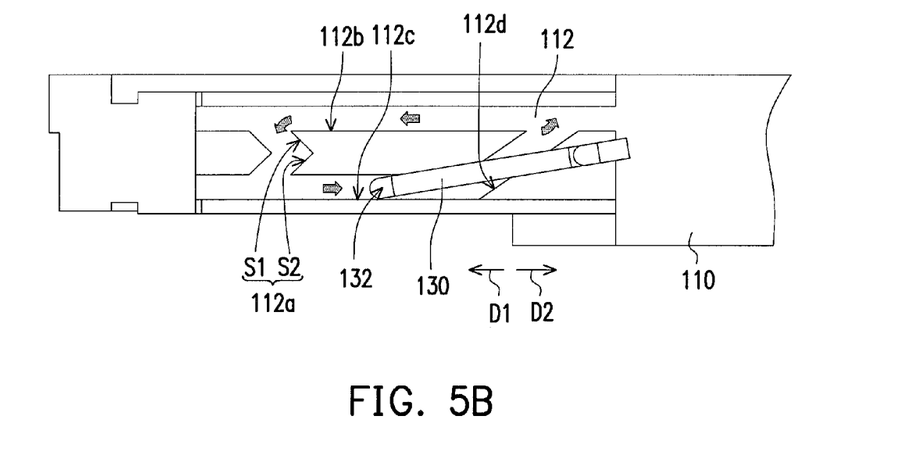
Figure 5C:
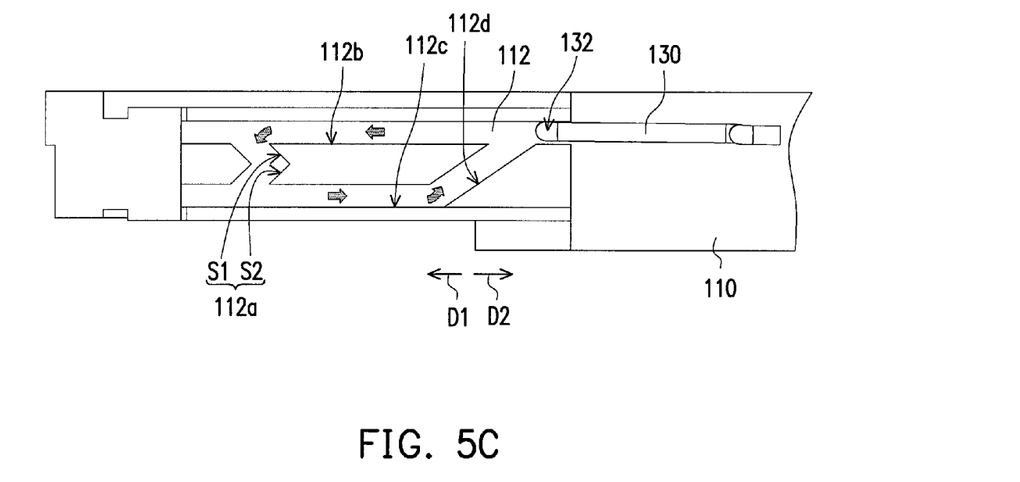
Figure 6A:
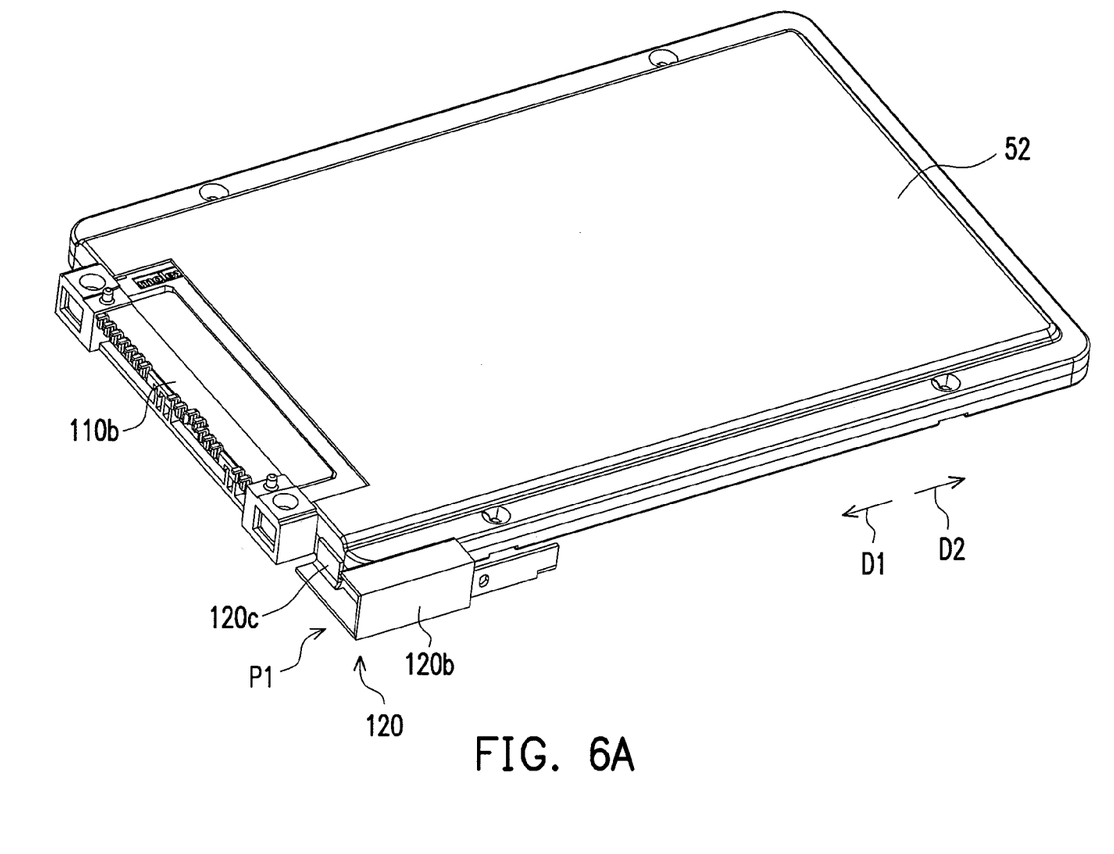
FIG. 6A is a 3D view illustrating a portion of the components of the electronic module and the electronic module fixing structure depicted in FIG. 2.
Figure 6B:
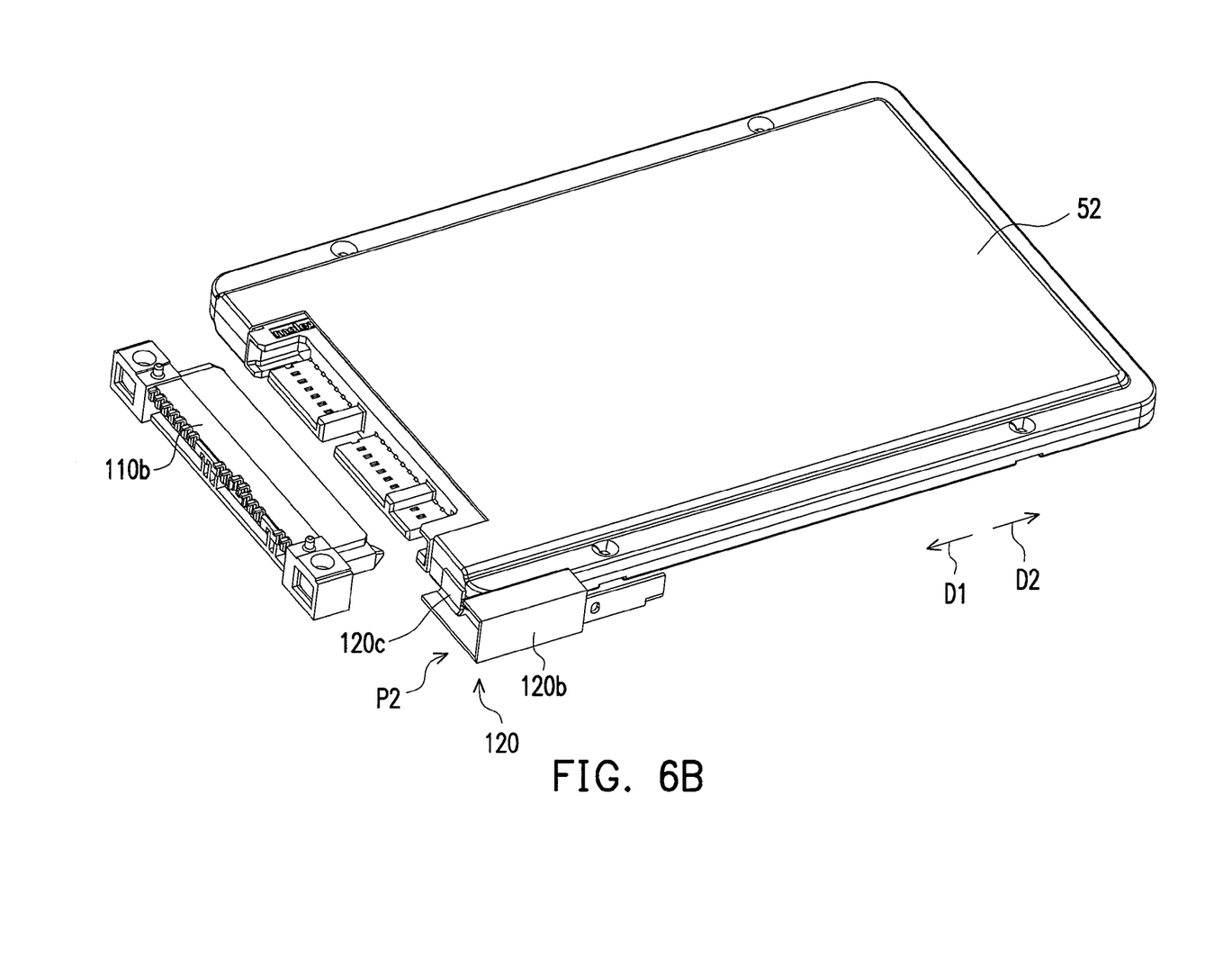
FIG. 6B is a schematic view illustrating the electronic module depicted in FIG. 6A pushed away from the main body by the sliding component.

FIG. 5A through FIG. 5C is an operation flowchart illustrating the rod depicted in FIG. 4. FIG. 6A is a 3D view illustrating a portion of the components of the electronic module and the electronic module fixing structure depicted in FIG. 2. FIG. 6B is a schematic view illustrating the electronic module depicted in FIG. 6A pushed away from the main body by the sliding component. For more clear views, FIG. 6A and FIG. 6B merely illustrate the electronic module 52, the sliding component 120 and the electrical connection portion 110b depicted in FIG. 2. When the electronic module 52 depicted in FIG. 2 receives a force along a first direction D1 to push the sliding component 120 to move along the first direction D1, the rod 130 is driven by the sliding component 120 to rotate relative to the sliding component 120, such that the end 132 of the rod 130 is driven to move away from positioning portion 112a, as shown in FIG. 5. Then, by the elastic force of the elastic component 140, the sliding component 120 slides from the first position P1 depicted in FIG. 6A to a second position P2 depicted in FIG. 6B along a second direction D2 opposite to the first direction D1. Thus, the electronic module 52 is pushed away from the main body 110 (FIG. 6B merely illustrates the electrical connection portion 110b of the main body 110).

During the process of the sliding component 120 sliding from the first position P1 to the second position P2, the rod 130 is driven by the sliding component 120 to be operated from a state shown in FIG. 5A to states shown in FIG. 5B and FIG. 5C. When a user desires to install the electronic module 52 depicted in FIG. 6B in the main body 110, the user may apply a force to the electronic module 52 along the second direction D2 to push the sliding component 120 along the second direction D2, such that the sliding component 120 resists the elastic force of the elastic component 140 (illustrated in FIG. 2) to slide from the second position P2 depicted in FIG. 6B to the first position P1 depicted in FIG. 6A. During the process of the sliding component 120 sliding from the second position P2 to the first position P1, the rod 130 is driven by the sliding component 120 to be operated from the state shown in FIG. 5C to the state shown in FIG. 5A, such that the end 132 of the rod 130 is driven to move to the positioning portion 112a along the track 112. When the sliding component 120 is located at the first position P1, the elastic component 140 is stretched, and the end 132 of the rod 130 tightly leans against the positioning portion 112a by the elastic force of the elastic component 140 to fix positions of the rod 130 and the sliding component 120.

In the aforementioned configuration, when the electronic module 52 is installed in the main body 110 of the electronic module fixing structure 100, the sliding component 120 is fixed by the rod 130 and the positioning portion 112a interfered with each other, such that the electronic module 52 is not possibly pushed by the sliding component 120 to move away from the main body 110. When the user desires to disassemble the electronic module 52, the user presses the electronic module 52 along the first direction D1 to drive the electronic module 52 to push the sliding component 120, and the rod 130 is rotated as the sliding component 120 moves. Thus, the end 132 of the rod 130 is driven to move from the positioning portion 112a along the track 112. When the end 132 of the rod 130 moves away from the positioning portion 112a, the sliding component is no longer fixed by the rod 130 and the positioning portion 112a interfered with each other, and thus, the sliding component 120 pushes the electronic module 52 away from the main body 110 by the elastic force of the elastic component 140. Accordingly, the sliding component 120 can push the electronic module 52 away from the main body 110 of the electronic module fixing structure 100 only by the user pressing the electronic module 52, such that the disassembly of the electronic module 52 becomes more simple and easy.

Referring to FIG. 2, in the present embodiment, an extension direction of each guiding rail 110a is parallel to the first direction D1 and the second direction D2, such that the electronic module 52 is adapted to be guided by the guiding rails 110a to move along the first direction D1 or the second direction D2. Referring FIG. 4 through FIG. 5C, in detail, the track 112 of the present embodiment includes a first segment 112b, a second segment 112c and a third segment 112d. The first segment 112b is connected with a side of the positioning portion 112a, and the end 132 of the rod 130 is adapted to be guided by the first segment 112b to move to the positioning portion 112a along the first direction D1. The second segment 112c is connected with the other side of the positioning portion 112a, and the end 132 of the rod 130 is adapted to be guided by the second segment 112c to move away from the positioning portion 112a along the second direction D2. The third segment 112d is connected between the first segment 112b and the second segment 112c, and the end 132 of the rod 130 is adapted to be guided by the third segment 112d to move from the second segment 112c to the first segment 112b. Additionally, in the present embodiment, the track 112 has a first inclined surface S1 and a second inclined surface S2. The first inclined surface S1 is intersected with the second inclined surface S2 to form the positioning portion 112a. When the sliding component 120 is located at the first position P1, as shown in FIG. 2 and FIG. 6A, the end 132 of the rod 130 is positioned between the first inclined surface S1 and the second inclined surface S2, as shown in FIG. 4.

Figure 7:
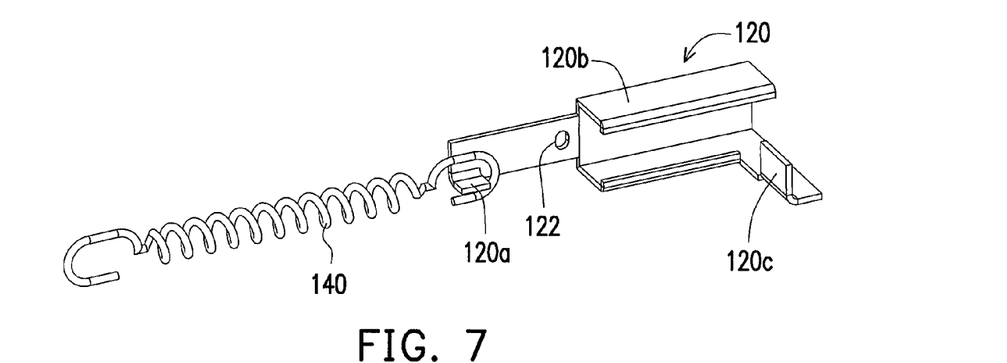
FIG. 7 is a 3D view illustrating the sliding component and the elastic component depicted in FIG. 2.

FIG. 7 is a 3D view illustrating the sliding component and the elastic component depicted in FIG. 2. Referring to FIG. 2 and FIG. 7, two ends of the elastic component 140 are respectively hooked by a bump 110d of the main body 110 and a bump 120a of the sliding component 120 for being adapted to be stretched while the sliding component 120 moves relative to the main body 110. As shown in FIG. 7, the sliding component 120 includes a sliding portion 120b and a pushing portion 120c. The sliding portion 120b is configured to slide in a sliding portion 110e (labeled in FIG. 3) of the main body 110, and the pushing portion 120c is configured to lean against and push the electronic module 52, as shown in FIG. 6A and FIG. 6B.

Figure 8:
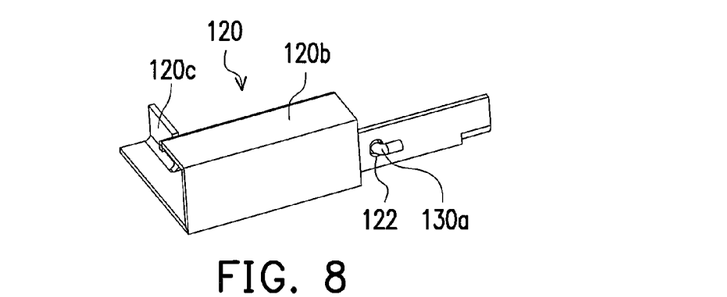
FIG. 8 is a 3D view illustrating the rod and the sliding component depicted in FIG. 2.

FIG. 8 is a 3D view illustrating the rod and the sliding component depicted in FIG. 2. Referring to FIG. 7 and FIG. 8, the sliding component 120 of the present embodiment has an axis aperture 122, and the rod 130 has a bending portion 130a. The bending portion 130a is pivoted to the axis aperture 122 of the sliding component 120, such that the rod 130 is adapted to rotate relative to the sliding component 120 by using the axis aperture 122 as a rotation center.

Figure 9:
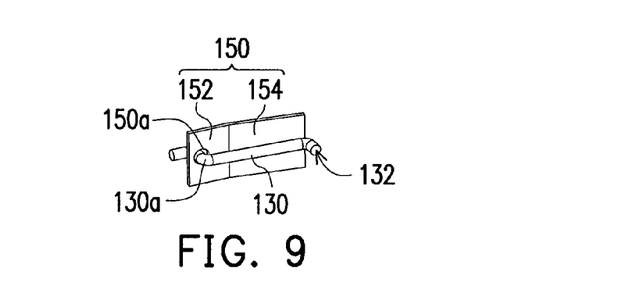
FIG. 9 is a 3D view illustrating the rod and the fixing plate depicted in FIG. 2.
Figure 10:
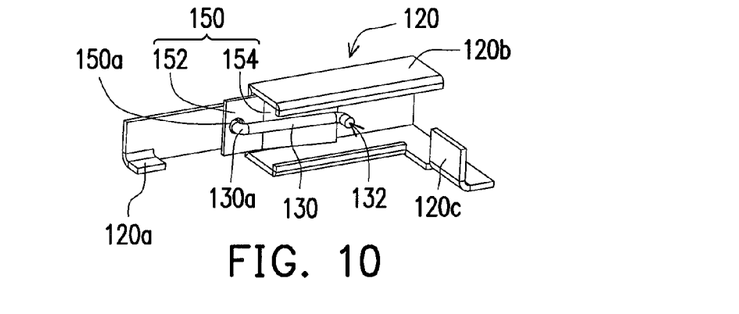
FIG. 10 is a 3D view illustrating the sliding component, the rod and the fixing plate depicted in FIG. 2.

FIG. 9 is a 3D view illustrating the rod and the fixing plate depicted in FIG. 2. FIG. 10 is a 3D view illustrating the sliding component, the rod and the fixing plate depicted in FIG. 2. Referring to FIG. 3, FIG. 9 and FIG. 10, in the present embodiment, the electronic module fixing structure 100 further includes a fixing plate 150. The fixing plate 150 is disposed between the sliding component 120 and the main body 110 and pushes against the rod 130 so as to limit the end 132 of the rod 130 in the track 112 as shown in FIG. 4 through FIG. 5C. In detail, the fixing plate 150 has an opening 150a. The bending portion 130a of the rod 130 sequentially penetrates the opening 150a of the fixing plate 150 and the axis aperture 122 (labeled in FIG. 8) of the sliding component 120. In addition, the fixing plate 150 includes a first plate body 152 and a second plate body 154. The first plate body 152 leans against the sliding component 120, and the second plate body 154 is connected with and inclined to the first plate body 152 for being adapted to push against the rod 130.

Figure 11:
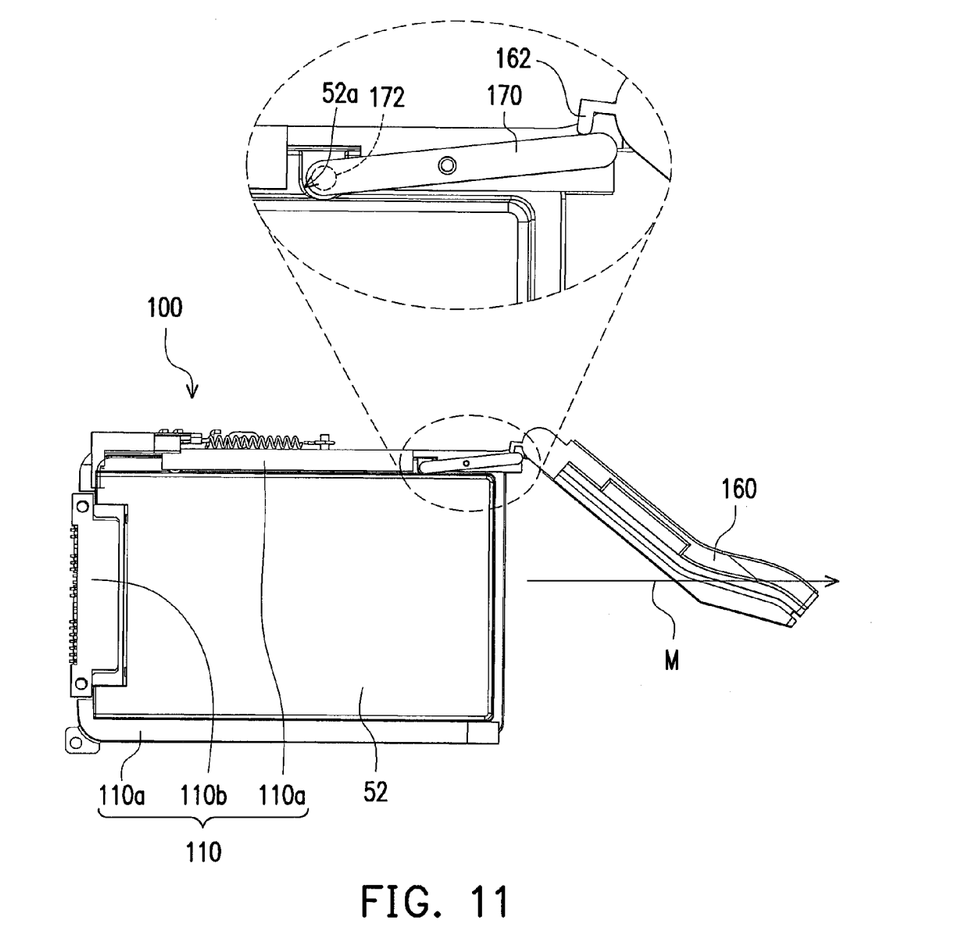
FIG. 11 is a bottom view illustrating the electronic module and the electronic module fixing structure depicted in FIG. 2.

FIG. 11 is a bottom view illustrating the electronic module and the electronic module fixing structure depicted in FIG. 2. Referring to FIG. 2, FIG. 3 and FIG. 11, in the present embodiment, the electronic module fixing structure 100 further includes a cover body 160 and a position-limiting component 170. The cover body 160 is pivoted to the main body 110 and configured to cover the electronic module 52 installed in the main body 110. The position-limiting component 170 is pivoted to the main body 110 and configured to limit the electronic module 52 in the main body 110.

Figure 12:
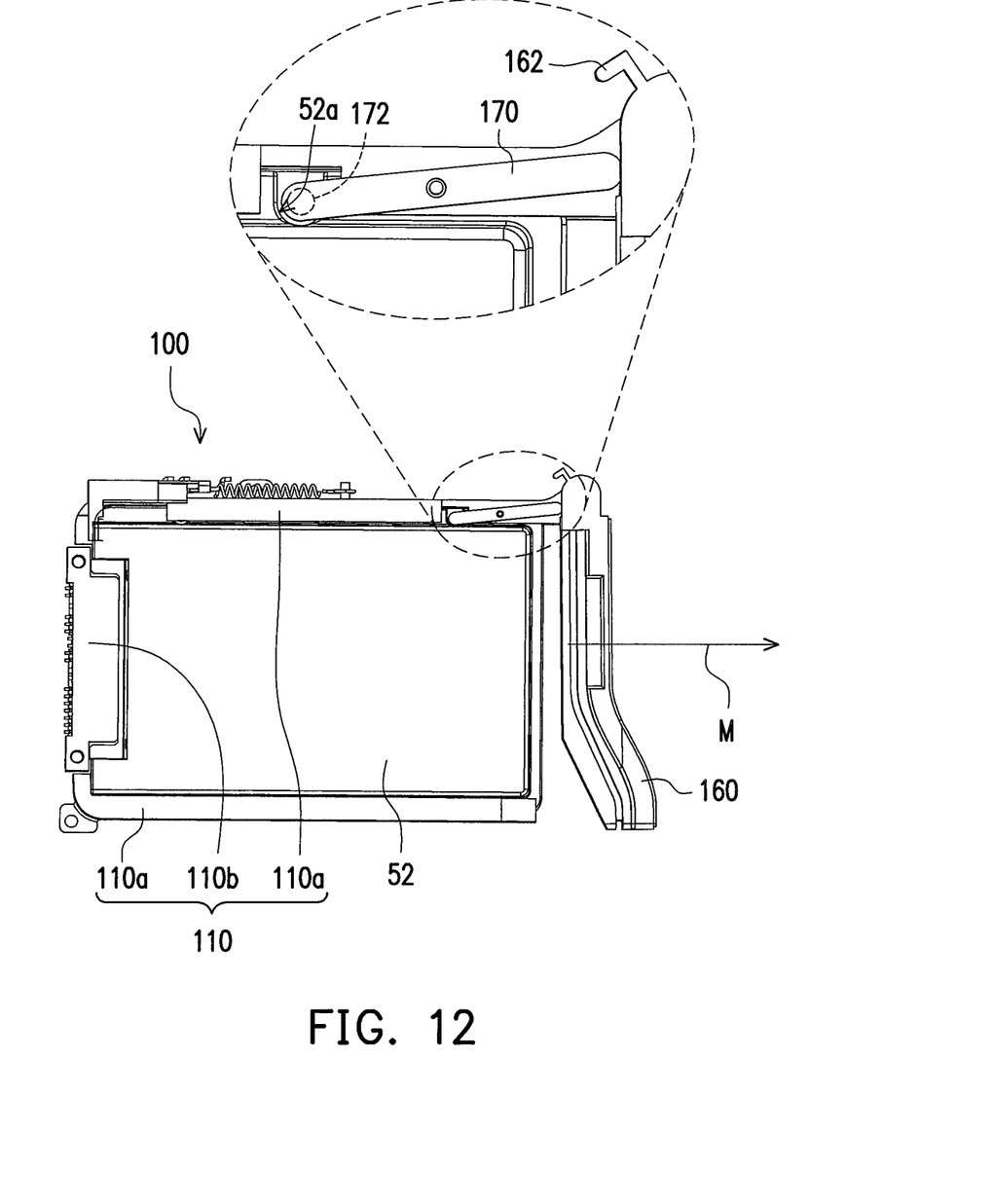
FIG. 12 is a schematic view illustrating the cover body depicted in FIG. 11 in a closed state.
Figure 13:
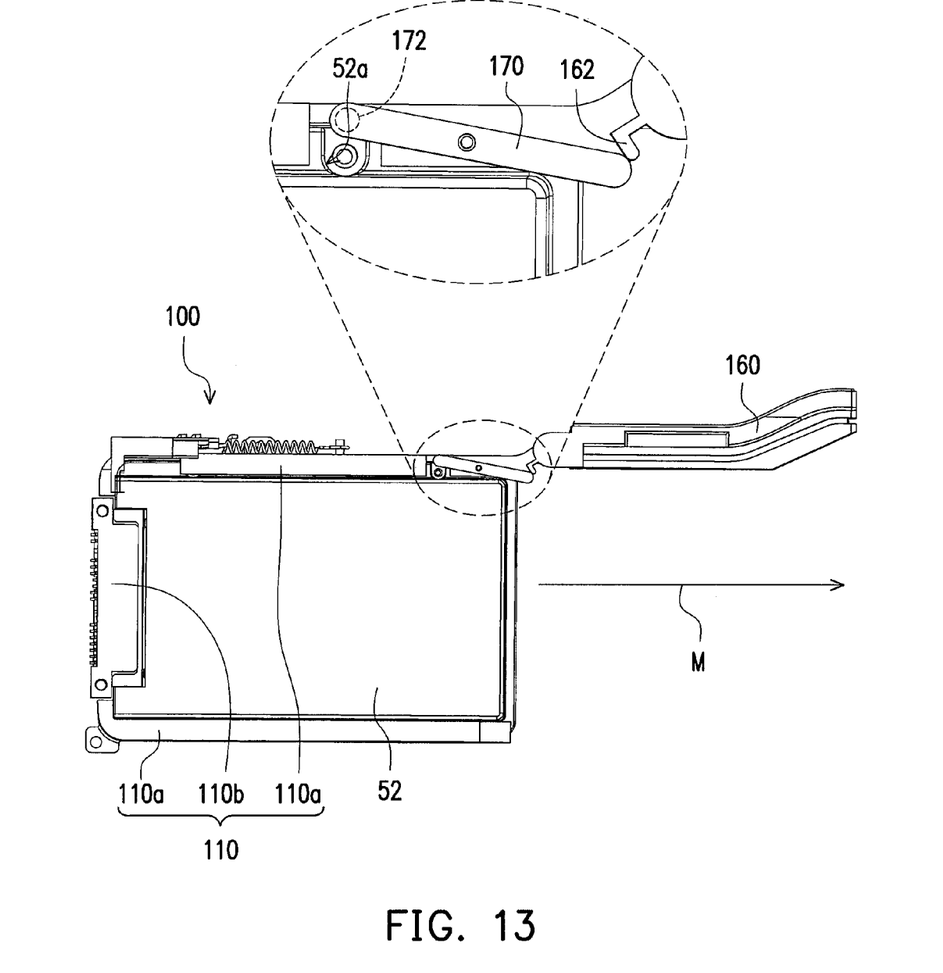
FIG. 13 is a schematic view illustrating the cover body depicted in FIG. 11 in an expanded state.

FIG. 12 is a schematic view illustrating the cover body depicted in FIG. 11 in a closed state. FIG. 13 is a schematic view illustrating the cover body depicted in FIG. 11 in an expanded state. In detail, the cover body 160 is adapted to be pivotally rotated to a closed state to cover the electronic module 52, as shown in FIG. 12, or to be pivotally rotated to an expanded state to expose the electronic module 52, as shown in FIG. 13. The electronic module 52 has a notch 52a, and the position-limiting component 170 has a protrusion 172. The protrusion 172 is adapted to enter the notch 52a, as shown in FIG. 11 and FIG. 12, to limit the electronic module 52 in the main body 110. When the cover body 160 is in the expanded state, as shown in FIG. 13, the position-limiting component 170 is pushed by a protruding portion 162 of the cover body 160 to drive the protrusion 172 of the position-limiting component 170 to move away from the notch 52a of the electronic module 52, so that the electronic module 52 is released.

In the present embodiment, when the sliding component 120 pushes the electronic module 52 away from the main body 110, the electronic module 52 moves away from the main body 110 along a moving path M, as shown in FIG. 11 through FIG. 13. When the cover body 160 is in the closed state as shown in FIG. 12 or in a half-expanded state as shown in FIG. 11, the cover body 160 is located on the moving path M, and the protrusion 172 of the position-limiting component 170 is located in the notch 52a of the electronic module 52 to prevent the electronic module 52 from protruding out along the moving path and hitting the cover body 160 when the cover body 160 is not fully expanded. When the cover body 160 is expanded to the expanded state as shown in FIG. 13, the cover body 160 is no longer located on the moving path, and the protrusion 172 of the position-limiting component 170 is driven by the cover body 160 to move away from the notch 52a. The electronic module 52 now may move away from the main body 110 along the moving path M. In other words, by configuring and operating the cover body 160 and the position-limiting component 170 in above-described manner, the electronic module 52 is limited to possibly moving away from the main body 110 only when the cover body 160 is expanded wide enough. In a situation that the cover body 160 is not expanded wide enough (as shown in FIG. 11 and FIG. 12), and if the electronic module 52 is pressed to drive the rod 130 to move away from the positioning portion 112a as shown in FIG. 5A, the electronic module 52 is not possibly pushed away from the main body 110 by the sliding component 120 due to the position-limitation by the position-limiting component 170. Thus, damage caused by the electronic module 52 hitting the cover body 160 along the moving path M can be avoided.

In light of the foregoing, when the electronic module of the present invention is installed in the main body of the electronic module fixing structure, the sliding component is fixed by the rod and the positioning portion interfered with each other, such that the electronic module is not possibly pushed by the sliding component to move away from the main body. When the user desires to disassemble the electronic module, the user can press the electronic module to drive the electronic module to push the sliding component so that the rod is rotated as the sliding component moves, and thus, the end of the rod is driven to move away from the positioning portion along the track. When the end of the rod moves away from the positioning portion, the sliding component pushes the electronic module away from the main body by the elastic force of the elastic component since the sliding component is no longer fixed by the rod and the positioning portion interfered with each other. Thus, the sliding component is driven to push the electronic module away from the main body of the electronic module fixing structure only by the user pressing the electronic module, such that the disassembly of the electronic module is more simple and easy. Additionally, by the interaction relationship between the cover body and the position-limiting component, the electronic module can be limited to possibly moving away from the main body only when the cover body is expanded wide enough so as to avoid damages caused by the electronic module hitting the cover body.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A portable electronic device, comprising:
an electronic module; and
an electronic module fixing structure, comprising:
a main body, having a track, wherein the track has a positioning portion;
a sliding component, slidably disposed on the main body, wherein when the electronic module is installed in the main body, the sliding component is located at a first position;
a rod, rotatably connected with the sliding component, wherein an end of the rod is adapted to move along the track, and the end of the rod and the positioning portion are interfered with each other such that the sliding component is positioned at the first position when the end of the rod is located at the positioning portion;

a fixing plate disposed between the sliding component and the main body and pushing against the rod to limit the end of the rod in the track, and an elastic component, connected between the main body and the sliding component, wherein when the electronic module receives a force to push the sliding component, the rod is rotated relative to the sliding component to drive the end of the rod to move away from the positioning portion, and the sliding component slides to a second position by the elastic force of the elastic component to push the electronic module away from the main body,.

wherein the rod is separated from the elastic component.

2. The portable electronic device according to claim 1, wherein when the sliding component resists the elastic force of the elastic component to slide from the second position to first position, the rod is rotated relative to the sliding component to drive the end of the rod to move to the positioning portion along the track.

3. The portable electronic device according to claim 1, wherein when the sliding component is located at the first position, the end of the rod tightly leans against the positioning portion by the elastic force of the elastic component.

4. The portable electronic device according to claim 1, wherein the electronic module is adapted to receive the force to push the sliding component along a first direction, the sliding component is adapted to slide from the first position to the second position along a second direction, and the first direction is opposite to the second direction.

5. The portable electronic device according to claim 4, wherein the main body comprises at least one guiding rail, an extending direction of the at least one guiding rail is parallel to the first direction and the second direction, and the electronic module is adapted to slide into the main body along the at least one guiding rail.

6. The portable electronic device according to claim 4, wherein the track comprises:

a first segment, connected with a side of the positioning portion, wherein the end of the rod is adapted to be guided by the first segment to move to the positioning portion along the first direction; and a second segment, connected with the other side of the positioning portion, wherein the end of the rod is adapted to be guided by the second segment to move away from the positioning portion along the second direction.

7. The portable electronic device according to claim 6, wherein the track further comprises a third segment connected between the first segment and the second segment, and the end of the rod is adapted to be guided by the third segment to move from the second segment to the first segment.

8. The portable electronic device according to claim 1, wherein the track has a first inclined surface and a second inclined surface, intersected with each other to form the positioning portion, and the end of the rod is positioned between the first inclined surface and the second inclined surface when the sliding component is located at the first position.

9. The portable electronic device according to claim 1, wherein the sliding component has an axis aperture, the rod has a bending portion, and the bending portion is pivoted to the axis aperture.

10. The portable electronic device according to claim 1, wherein the fixing plate has an opening, and the rod penetrates the opening.

11. The portable electronic device according to claim 1, wherein the fixing plate comprises:

a first plate body, leaning against the sliding component; and a second plate body, connected with and inclined to the first plate body and pushing against the rod.

12. The portable electronic device according to claim 1, wherein the electronic module fixing structure further comprises:

a cover body, pivoted to the main body, wherein the cover body is adapted to be pivotally rotated to a closed state to cover the electronic module or pivotally rotated to an expanded state to expose the electronic module; and a position-limiting component, pivoted to the main body and limiting the electronic module in the main body, wherein the position-limiting component is pushed by the cover body to release the electronic module when the cover body is in the expanded state.

13. The portable electronic device according to claim 12, wherein when the sliding component pushes the electronic module away from the main body, the electronic module moves away from the main body along a moving path, when the cover body is in the closed state, the cover body is located on the moving path, and when the cover body is in the expanded state, the cover body is not located on the moving path.

14. The portable electronic device according to claim 12, wherein the electronic module has a notch, the position-limiting component has a protrusion, the protrusion is adapted to enter the notch to limit the electronic module, and the protrusion moves away from the notch to release the electronic module when the position-limiting component is pushed by the cover body.

15. The portable electronic device according to claim 1, wherein the main body comprises an electrical connection portion, and the electronic module is plugged to the electrical connection portion when the electronic module is installed in the main body.

16. The portable electronic device according to claim 1, wherein the electronic module is a hard-disk module.

17. An electronic module fixing structure, applicable to a portable electronic device comprising an electronic module, the electronic module fixing structure comprising:

a main body, having a track, wherein the track has a positioning portion;

a sliding component, slidably disposed on the main body, wherein when the electronic module is installed in the main body, the sliding component is located at a first position;

a rod, rotatably connected with the sliding component, wherein an end of the rod is adapted to move along the track, the end of the rod and the positioning portion are interfered with each other such that the sliding component is positioned at the first position when the end of the rod is located at the positioning portion;

a fixing plate disposed between the sliding component and the main body and pushing against the rod to limit the end of the rod in the track, and an elastic component, connected between the main body and the sliding component, wherein when the electronic module receives a force to push the sliding component, the rod is rotated relative to the sliding component to drive the end of the rod to move away from the positioning position, and the sliding component slides to a second position by the elastic force of the elastic component to push the electronic module away from the main body, wherein the rod is separated from the elastic component.

18. The electronic module fixing structure according to claim 17, wherein when the sliding component resists the elastic force of the elastic component to slide from the second position to first position, the rod is rotated relative to the sliding component to drive the end of the rod to move to the positioning portion along the track.

19. The electronic module fixing structure according to claim 17, wherein when the sliding component is located at the first position, the end of the rod tightly leans against the positioning portion by the elastic force of the elastic component.

20. The electronic module fixing structure according to claim 17, wherein the electronic module is adapted to receive the force to push the sliding component along a first direction, the sliding component is adapted to slide from the first position to the second position along a second direction, and the first direction is opposite to the second direction.

21. The electronic module fixing structure according to claim 20, wherein the main body comprises at least one guiding rail, an extending direction of the at least one guiding rail is parallel to the first direction and the second direction, and the electronic module is adapted to slide into the main body along the at least one guiding rail.

22. The electronic module fixing structure according to claim 20, wherein the track comprises:
 a first segment, connected with a side of the positioning portion, wherein the end of the rod is adapted to be guided by the first segment to move to the positioning portion along the first direction; and
 a second segment, connected with the other side of the positioning portion, wherein the end of the rod is adapted to be guided by the second segment to move away from the positioning portion along the second direction.

23. The electronic module fixing structure according to claim 22, wherein the track further comprises a third segment connected between the first segment and the second segment, and the end of the rod is adapted to be guided by the third segment to move from the second segment to the first segment.

24. The electronic module fixing structure according to claim 17, wherein the track has a first inclined surface and a second inclined surface, intersected with each other to form the positioning portion, and the end of the rod is positioned between the first inclined surface and the second inclined surface when the sliding component is located at the first position.

25. The electronic module fixing structure according to claim 17, wherein the sliding component has an axis aperture, the rod has a bending portion, and the bending portion is pivoted to the axis aperture.

26. The electronic module fixing structure according to claim 17, wherein the fixing plate has an opening, and the rod penetrates the opening.

27. The electronic module fixing structure according to claim 17, wherein the fixing plate comprises:
 a first plate body, leaning against the sliding component; and
 a second plate body, connected with and inclined to the first plate body and pushing against the rod.

28. The electronic module fixing structure according to claim 17, further comprising:
 a cover body, pivoted to the main body, wherein the cover body is adapted to be pivotally rotated to a closed state to cover the electronic module or pivotally rotated to an expanded state to expose the electronic module; and
 a position-limiting component, pivoted to the main body and limiting the electronic module in the main body, wherein the position-limiting component is pushed by the cover body to release the electronic module when the cover body is in the expanded state.

29. The electronic module fixing structure according to claim 28, wherein when the sliding component pushes the electronic module away from the main body, the electronic module moves away from the main body along a moving path, when the cover body is in the closed state, the cover body is located on the moving path, and when the cover body is in the expanded state, the cover body is not located on the moving path.

30. The electronic module fixing structure according to claim 28, wherein the electronic module has a notch, the position-limiting component has a protrusion, the protrusion is adapted to enter the notch to limit the electronic module, and the protrusion moves away from the notch to release the electronic module when the position-limiting component is pushed by the cover body.

31. The electronic module fixing structure according to claim 17, wherein the main body comprises an electrical connection portion, and the electronic module is plugged to the electrical connection portion when the electronic module is installed in the main body.

32. The electronic module fixing structure according to claim 17, wherein the electronic module is a hard-disk module.

* * * * *